（12） United States Patent
Divay et al.

(10) Patent No.: US 7,580,838 B2
(45) Date of Patent: Aug. 25, 2009

(54) AUTOMATIC INSERTION OF NON-VERBALIZED PUNCTUATION

(75) Inventors: Olivier Divay, Arlington, MA (US); Jonathan Watson, Belmont, MA (US); Allan Gold, Acton, MA (US); Stijn Van Even, Jamaica Plain, MA (US)

(73) Assignee: Scansoft, Inc., Peabody, MA (US)

( * ) Notice: Subject to any disclaimer, the term of this patent is extended or adjusted under 35 U.S.C. 154(b) by 829 days.

(21) Appl. No.: 10/718,042

(22) Filed: Nov. 21, 2003

(65) Prior Publication Data

US 2004/0138881 A1 Jul. 15, 2004

Related U.S. Application Data

(60) Provisional application No. 60/428,232, filed on Nov. 22, 2002.

(51) Int. Cl.
G10F 15/00 (2006.01)
(52) U.S. Cl. .................. 704/257; 704/6; 704/9
(58) Field of Classification Search ................ 704/235, 704/2, 255, 244, 270, 257, 9, 6, 270.1, 1, 704/276; 715/512
See application file for complete search history.

(56) References Cited

U.S. PATENT DOCUMENTS

| 5,864,805 | A | | 1/1999 | Chen et al. | |
|---|---|---|---|---|---|
| 5,920,877 | A | * | 7/1999 | Kolster | ........................ 715/512 |
| 6,067,514 | A | | 5/2000 | Chen | |
| 6,195,637 | B1 | | 2/2001 | Ballard et al. | |
| 6,356,865 | B1 | * | 3/2002 | Franz et al. | .................... 704/2 |
| 6,718,303 | B2 | * | 4/2004 | Tang et al. | .................. 704/235 |
| 6,778,958 | B1 | * | 8/2004 | Nishimura et al. | .......... 704/235 |
| 7,089,184 | B2 | * | 8/2006 | Rorex | ......................... 704/255 |
| 7,313,526 | B2 | * | 12/2007 | Roth et al. | .................. 704/270 |

OTHER PUBLICATIONS

"Automatic Capitalization and Spacing of Sentences," IBM Technical Disclosure Bulletin, IBM Corp., New York, vol. 28, No. 9, Feb. 1986, pp. 4160-4161, XP-001028463.

Ji-Hwan Kim et al., "The use of Prosody in a Combined System for Punctuation Generation and Speech Recognition," 7th European Conference on Speech Communication and Technology, Eurospeech 2001, Aalborg, Denmark, Sep. 3-7, 2001, pp. 2757-2760, XP-002271470.

C. Julian Chen, "Speech Recognition with Automatic Punctuation," in Proc. Eurospeech, vol. 1, 6th European Conference on Speech Communication and Technology, Sep. 5-9, 1999, Budapest, Hungary, pp. 447-450.

Andreas Stokcke, Elizabeth Shriberg, Rebecca Bate, Mari Ostendorf, Dilek Hakkani, Madelaine Plauche, Gokhan Tur and Yu Lu, "Automatic Detection of Sentence Boundaries and Disfluencies Based on Recognized Words," in proceedings of the International Conference on Spoken Language Processing, vol. 5, Sydney, 1998, pp. 2247-2250.

(Continued)

*Primary Examiner*—Huyen X. Vo
(74) *Attorney, Agent, or Firm*—Chapin IP Law, LLC

(57) ABSTRACT

Recognizing punctuation in computer-implemented speech recognition includes performing speech recognition on an utterance to produce a recognition result for the utterance. A non-verbalized punctuation mark is identified in a recognition result and the recognition result is formatted based on the identification.

14 Claims, 12 Drawing Sheets

OTHER PUBLICATIONS

Elizabeth Shriberg, Andreas Stolcke, and Don Baron, Can Prosody Aid the Automatic Processing of Multi-Party Meetings? Evidence from Predicting Punctuation, Disfluencies, and Overlapping Speech, in Proceedings ISCA Tutorial and Research Workshop on Prosody in Speech Recognition and Understanding, Red Bank, NJ, 2001.

Yoshihiko Gotoh and Steve Renals, "Sentence Boundary Detection in Broadcast Speech Transcripts," in Proceeding of the ISCA Workshop: Automatic Speech Recognition: Challenges for the New Millennium (ASR-2000), Paris, Sep. 2000 (8 pages).

Ji-Hwan Kim and P.C. Woodland, "The Use of Prosody in a Combined System for Punctuation Generation and Speech Recognition," in Proc. Eurospeech '01, Aalborg, Denmark, Sep. 2001.

Heidi Christensen Yoshi Gotoh, and Steve Renals, "Punctuation Annotation using Statistical Prosody Models," in Proc. ISCA Workshop on Prosody in Speech Recognition and Understanding, to appear (2001).

Elizabeth Shriberg and Andreas Stolcke, "Prosody Modeling for Automatic Speech Understanding: An Overview of Recent Research at SRI", 2001.

Elizabeth Schriberg, Andreas Stolcke, Dilek Hakkani-Tur, and Gokhan Tur, "Prosody-Based Automatic Segmentation of Speech into Sentences and Topics," Speech Communication 32(1-2), Sep. 2000.

Jing Huang and Geoffrey Zweig, "Maximum Entropy Model for Punctuation Annotation From Speech," ICSLP 2002 proceedings.

* cited by examiner

AUTOMATIC INSERTION OF NON-VERBALIZED PUNCTUATION

CROSS REFERENCE TO RELATED APPLICATIONS

This application claims the benefit of U.S. Provisional Application No. 60/428,232, filed Nov. 22, 2002, and titled "Automatic Insertion of Nonverbalized Punctuation In Speech Recognition," which is incorporated by reference in its entirety.

TECHNICAL FIELD

This description relates to automatic insertion of non-verbalized punctuation in speech recognition.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases irrespective of whether the user pauses between them.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding sequences of words that jointly fit the acoustic model and language model and best match the digital frames of an utterance. An acoustic model may correspond to a word, a phrase, or a command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate for an utterance, or may produce a list of recognition candidates. In producing the recognition candidates, the processor may make use of a language model that accounts for the frequency at which words typically are used in relation to one another.

SUMMARY

In one general aspect, recognizing punctuation in computer-implemented speech recognition includes performing speech recognition on an utterance to produce a recognition result for the utterance. A non-verbalized punctuation mark is identified in a recognition result and the recognition result is formatted based on the identification.

Implementations may include one or more of the following features. For example, the non-verbalized punctuation mark may be identified by predicting the non-verbalized punctuation mark using at least one text feature and at least one acoustic feature related to the utterance. The acoustic feature may include a period of silence, a function of pitch of words near the period of silence, an average pitch of words near the period of silence, and/or a ratio of an average pitch of words near the period of silence.

The recognition result may be formatted by controlling or altering spacing relative to the non-verbalized punctuation mark. The recognition result may be formatted by controlling or altering capitalization of words relative to the non-verbalized punctuation mark.

In one implementation, the non-verbalized punctuation mark may include a period and the recognition result may be formatted by inserting an extra space after the period and capitalizing a next word following the period.

A portion of the recognition result that includes the non-verbalized punctuation mark may be selected for correction and that portion of the recognition result may be corrected with one of a number of correction choices. At least one of the correction choices may include a change to the non-verbalized punctuation mark. At least one of the correction choices may not include the non-verbalized punctuation mark.

In another general aspect, correcting incorrect text associated with recognition errors in computer-implemented speech recognition may include performing speech recognition on an utterance to produce a recognition result for the utterance. A portion of the recognition result that includes the non-verbalized punctuation may be selected for correction and that portion of the recognition result may be corrected with one of a number of correction choices.

Implementations may include one or more of the following features. For example, at least one of the correction choices may include a change to the non-verbalized punctuation. At least one of the correction choices may not include the non-verbalized punctuation. The non-verbalized punctuation may include a non-verbalized punctuation mark. The non-verbalized punctuation may be changed and text surrounding the non-verbalized punctuation may be reformatted to be grammatically consistent with the changed non-verbalized punctuation. The changes to the non-verbalized punctuation and reformatting of the text may be in response to a single user action.

In another general aspect, recognizing punctuation in computer-implemented speech recognition dictation may include performing speech recognition on an utterance to produce a recognition result for the utterance. A non-verbalized punctuation mark may be identified in the recognition result and it may be determined where to insert the non-verbalized punctuation mark within the recognition result based on the identification using at least one text feature and at least one acoustic feature related to the utterance to predict where to insert the non-verbalized punctuation mark.

Implementations may include one or more of the following features. For example, the acoustic feature may include a period of silence, a function of pitch of words near the period of silence, an average pitch of words near the period of silence, and/or a ratio of an average pitch of words near the period of silence.

In another general aspect, a graphical user interface for correcting incorrect text associated with recognition errors in computer-implemented speech recognition may include a window to display a selected recognition result including non-verbalized punctuation associated with an utterance. The graphical user interface also includes a list of recognition alternatives with at least one of the recognition alternatives including a change to the non-verbalized punctuation and associated adjustments in spacing and other punctuation.

Implementations may include one or more of the following features. For example, the non-verbalized punctuation may include a period. The non-verbalized punctuation may include a comma.

In one implementation, the change to the non-verbalized punctuation may include a change from a period to a comma and the associated adjustments in spacing and other punctuation may include removing a space after the comma and uncapitalizing a word following the comma. In another implementation, the change to the non-verbalized punctuation may include a change from a comma to a period. The associated adjustments in spacing and other punctuation may include adding a space after the period and capitalizing a word following the period.

These general and specific aspects may be implemented using a system, a method, or a computer program, or any combination of systems, methods, and computer programs.

Other features and advantages will be apparent from the description and drawings, and from the claims.

DESCRIPTION OF THE DRAWINGS

Like reference symbols in the various drawings may indicate like elements.

DETAILED DESCRIPTION

In traditional speech recognition systems, in order to have punctuation marks, such as, for example, commas, periods, and question marks, appear in the recognized text, each punctuation mark must be pronounced. However, in natural speech, punctuation marks usually are not pronounced. Accordingly, a speech recognition system may include a punctuation system that automatically determines where to insert punctuation marks in recognized text without requiring the punctuation marks to be pronounced, and then adjusts the recognized text based on the determination.

Figure 1:
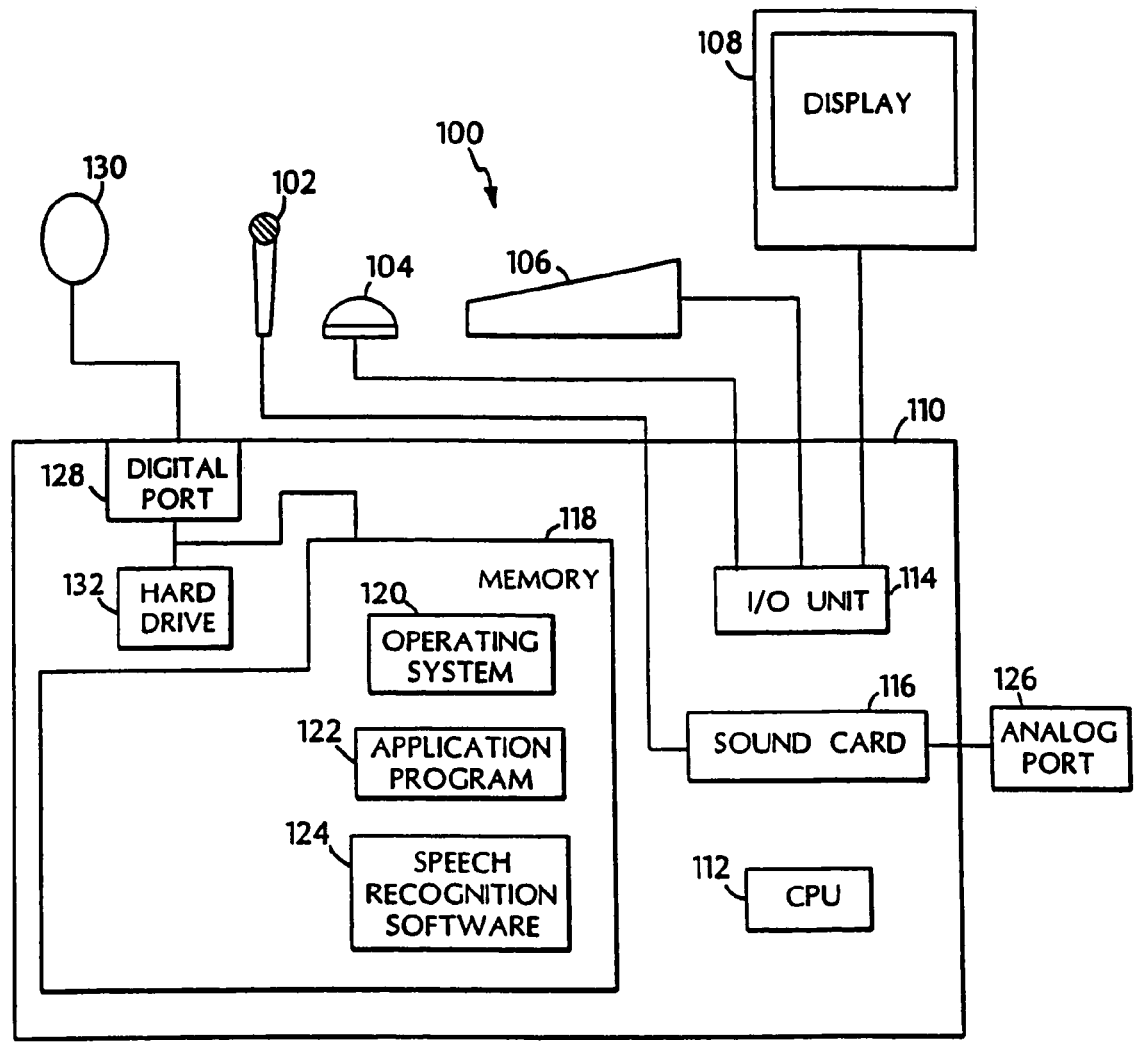
FIG. 1 is a block diagram of a speech recognition system.

Referring to FIG. 1, a speech recognition system 100 includes input/output (I/O) devices (for example, a microphone 102, a mouse 104, a keyboard 106 and a display 108) and a computer 110 having a central processing unit (CPU) 112, an I/O unit 114, and a sound card 116. A memory 118 stores data and programs such as an operating system 120 (for example, DOS, Windows®, Windows® 95, Windows® 98, Windows® 2000, Windows® NT, Windows® Millennium Edition, Windows® XP, OS/2®, Mac OS®, and Linux), an application program 122, and speech recognition software 124. Other examples of system 100 include a workstation, a server, a device, a component, other equipment or some combination thereof capable of responding to and executing instructions in a defined manner.

Examples of application programs 122 include authoring applications (for example, word processing programs, database programs, spreadsheet programs, presentation programs, electronic mail programs and graphics programs) capable of generating documents or other electronic content, browser applications (for example, Netscape's Navigator and Microsoft's Internet Explorer) capable of rendering standard Internet content, personal information management (PIM) programs (for example, Microsoft® Outlook®, Outlook® Express, and Lotus Notes®) capable of managing personal information, and other programs (for example, contact management software, time management software, expense reporting applications, and fax programs). Any of the Dragon NaturallySpeaking® software versions, available from ScanSoft, Inc. of Peabody, Mass., offer examples of suitable speech recognition software 124.

The computer 110 may be used for speech recognition. In this case, the microphone 102 receives the user's speech and conveys the speech, in the form of an analog signal, to the sound card 116, which in turn passes the signal through an analog-to-digital (A/D) converter to transform the analog signal into a set of digital samples. Under control of the operating system 120 and the speech recognition software 124, the processor 112 identifies utterances in the user's speech. Utterances are separated from one another by a pause having a sufficiently large, predetermined duration (for example, 160-250 milliseconds). Each utterance may include one or more words of the user's speech.

The system also may include an analog recorder port 126 and/or a digital recorder port 128. The analog recorder port 126 is connected to the sound card 116 and is used to transmit speech recorded using an analog or digital hand-held recorder to the sound card. The analog recorder port 126 may be implemented using a line-in port. The hand-held recorder is connected to the port using a cable connected between the line-in port and a line-out or speaker port of the recorder. The analog recorder port 126 may be implemented as a microphone positioned so as to be next to the speaker of the handheld recorder when the recorder is inserted into the port 126, and also may be implemented using the microphone 102. Alternatively, the analog recorder port 126 may be implemented as a tape player that receives a tape recorded using a hand-held recorder and transmits information recorded on the tape to the sound card 116.

The digital recorder port 128 may be implemented to transfer a digital file generated using a hand-held digital recorder 130. This file may be transferred directly into memory 118, or to a storage device such as hard drive 132. The digital recorder port 128 may be implemented as a storage device (for example, a floppy drive or CD-ROM drive) of the computer 110, or as an I/O port (for example, a USB port).

Figure 2:
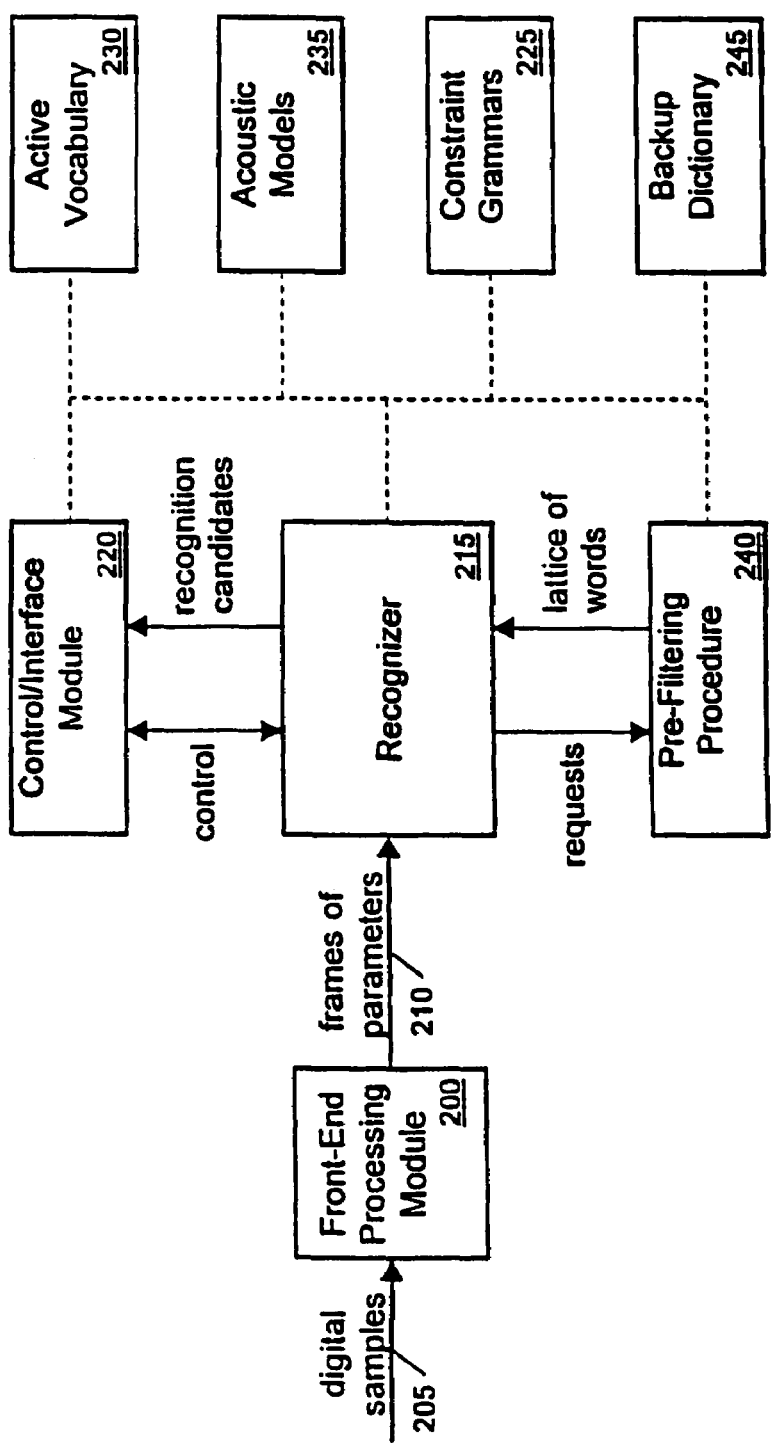
FIGS. 2 and 3 are block diagrams of speech recognition software of the system of FIG. 1.

FIG. 2 illustrates components of the speech recognition software 124. For ease of discussion, the following description indicates that the components carry out operations to achieve specified results. However, it should be understood that each component typically causes the processor 112 to operate in the specified manner. The speech recognition software 124 typically includes one or more modules, such as a front end processing module 200, a recognizer, 215, a control/interface module 220, a constraint grammar module 225, an active vocabulary module 230, an acoustic model module 235, a pre-filtering module 240, and a backup dictionary module 245.

Initially, a front end processing module 200 converts the digital samples 205 from the sound card 116 (or from the digital recorder port 128) into frames of parameters 210 that represent the frequency content of an utterance. Each frame may include 24 parameters and represents a short portion (for example, 10 milliseconds) of the utterance.

A recognizer 215 receives and processes the frames of an utterance to identify text corresponding to the utterance. The recognizer 215 entertains several hypotheses about the text and associates a score with each hypothesis. The score reflects the probability that a hypothesis corresponds to the user's speech. For ease of processing, scores may be maintained as negative logarithmic values. Accordingly, a lower score indicates a better match (a higher probability) while a higher score indicates a less likely match (a lower probability), with the likelihood of the match decreasing as the score increases. After processing the utterance, the recognizer 215 provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases, or sentences.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (for example, "file" or "edit") or command words for navigating through the menu (for example, "up", "down", "top" or "bottom"). Different constraint grammars may be active at different times. For example, a constraint grammar may be associated with a particular application program 122 and may be activated when the user opens the application program 122 and deactivated when the user closes the application program 122. The recognizer 215 may discard any hypothesis that does not comply with an active constraint grammar. In addition, the recognizer 215 may adjust the score of a hypothesis associated with a particular constraint grammar based on characteristics of the constraint grammar.

Another constraint grammar 225 that may be used by the speech recognition software 124 is a large vocabulary dictation grammar. The large vocabulary dictation grammar identifies words included in the active vocabulary 230, which is the vocabulary of words known to the software. The large vocabulary dictation grammar also includes a language model that indicates the frequency with which words occur.

Other examples of constraint grammars 225 include an in-line dictation macros grammar for dictation commands, such as "CAP" or "Capitalize" to capitalize a word and "New-Paragraph" to start a new paragraph; a text range selection grammar used in selecting text; an error correction commands grammar; a dictation editing grammar; an application command and control grammar that may be used to control a particular application program 122; a global command and control grammar that may be used to control the operating system 120 and the speech recognition software 124; a menu and dialog tracking grammar that may be used to manipulate menus and dialog; and a keyboard control grammar that permits the use of speech in place of input devices, such as the keyboard 106 or the mouse 104.

A large vocabulary dictation grammar may include multiple dictation topics (for example, "medical" or "legal"), each having its own vocabulary file and its own language model. A dictation topic includes a set of words that represents the active vocabulary 230. In a typical example, a topic may include approximately 30,000 words that are considered for normal recognition.

A complete dictation vocabulary consists of the active vocabulary 230 plus a backup vocabulary 245. The backup vocabulary 245 may include files that contain user-specific backup vocabulary words and system-wide backup vocabulary words.

User-specific backup vocabulary words include words that a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words that may currently be in an active vocabulary.

The control/interface module 220 controls operation of the speech recognition software and provides an interface to other software or to the user. The control/interface module 220 receives the list of recognition candidates for each utterance from the recognizer 215. Recognition candidates may correspond to dictated text, speech recognition commands, or external commands. When the best-scoring recognition candidate corresponds to dictated text, the control/interface module 220 provides the text to an active application, such as a word processor. The control/interface module 220 also may display the best-scoring recognition candidate to the user through a graphical user interface. When the best-scoring recognition candidate is a command, the control/interface module 220 implements the command. For example, the control/interface module 220 may control operation of the speech recognition software 124 in response to speech recognition commands (for example, "wake up" or "make that"), and may forward external commands to the appropriate software.

The control/interface module 220 also may control the active vocabulary 230, acoustic models 235, and constraint grammars 225 that are used by the recognizer 215. For example, when the speech recognition software 124 is being used in conjunction with a particular application program 122 (for example, Microsoft Word), the control/interface module 220 updates the active vocabulary 230 to include command words associated with that application and activates constraint grammars 225 associated with the application program 122.

Other functions provided by the control/interface module 220 include an enrollment program, a vocabulary customizer, and a vocabulary manager. The enrollment program collects acoustic information from a user and trains or adapts a user's models based on that information. The vocabulary customizer optimizes the language model of a specific topic. The vocabulary manager is a tool that is used by developers to browse and manipulate vocabularies, grammars, and macros.

Each function of the control/interface module 220 may be implemented as an executable program that is separate from the main speech recognition software.

The control/interface module 220 also may implement error correction and cursor/position manipulation procedures of the software 124. Error correction procedures include, for example a "make that" command and a "spell that" command. Cursor/position manipulation procedures include the "select" command discussed above and variations thereof (for example, "select [start] through [end]"), "insert before/after" commands, and a "resume with" command.

The control/interface module 220 may implement error correction procedures of the speech recognition software 124. When the speech recognition system 100 makes a recognition error, the user may invoke an appropriate correction command to remedy the error. During error correction, word searches of the backup dictionary 245 start with the user-specific backup dictionary and then check the system-wide backup dictionary. The backup dictionary 245 also is searched when there are new words in text that a user has typed.

In general, the backup dictionary 245 includes substantially more words than are included in the active vocabulary 230. For example, when the active vocabulary 230 has 60,000 or so entries, the backup dictionary 245 may have roughly 190,000 entries. The active vocabulary 230 is a dynamic vocabulary in that entries may be added or subtracted from the active vocabulary over time. For example, when the user indicates that an error has been made and the control/interface module 220 uses the backup dictionary 245 to correct the error, a new word from the backup dictionary 245 may be added to the active vocabulary 230 to reduce the likelihood that the error will be repeated.

In one implementation, one or more language models may be employed by the recognizer. In determining the acoustic models that best match an utterance, the processor may consult a language model that indicates a likelihood that the text corresponding to the acoustic model occurs in speech. For example, one language model may include a bigram model that indicates the frequency with which a words occurs in the context of a preceding word. For instance, a bigram model may indicate that a noun or an adjective such as "word" is more likely to follow the word "the" than a verb such as "is."

The language model may be generated from a large sample of text. In general, probabilities produced by the language model do not change during use. However, the language model may change as words are added to or subtracted from the language model as the words are added to or subtracted from the active vocabulary. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word. The language model also may be a trigram model that indicates the frequency with which a word occurs in the context of two preceding words, or some other variation.

Another exemplary language model is a category language model that indicates the frequency with which a word occurs in the context of a preceding category. For example, a simple category model may include categories such as "nouns" or "adjectives." For instance, such a simple category model may indicate that the word "is" is more likely to follow words from the "nouns" category than words from the "adjectives" category. More complex category models may include categories such as "places," "sports adjectives," or "medical nouns."

As with the word bigram model, the category model may be generated from a large sample of data and may include probabilities that do not change during use.

Other exemplary language models may include a unigram topic language model, a bigram topic language model, and a trigram topic language model, each of which may be based on a source of text associated with a user. In one implementation, the topic language model may include a single language model associated with a particular user that contains unigram, bigram, and trigram information.

The various language models discussed above may be included in a single language model or may be divided into one or more associated language models. Each user of the speech recognition system may have one or more language models.

Figure 3:
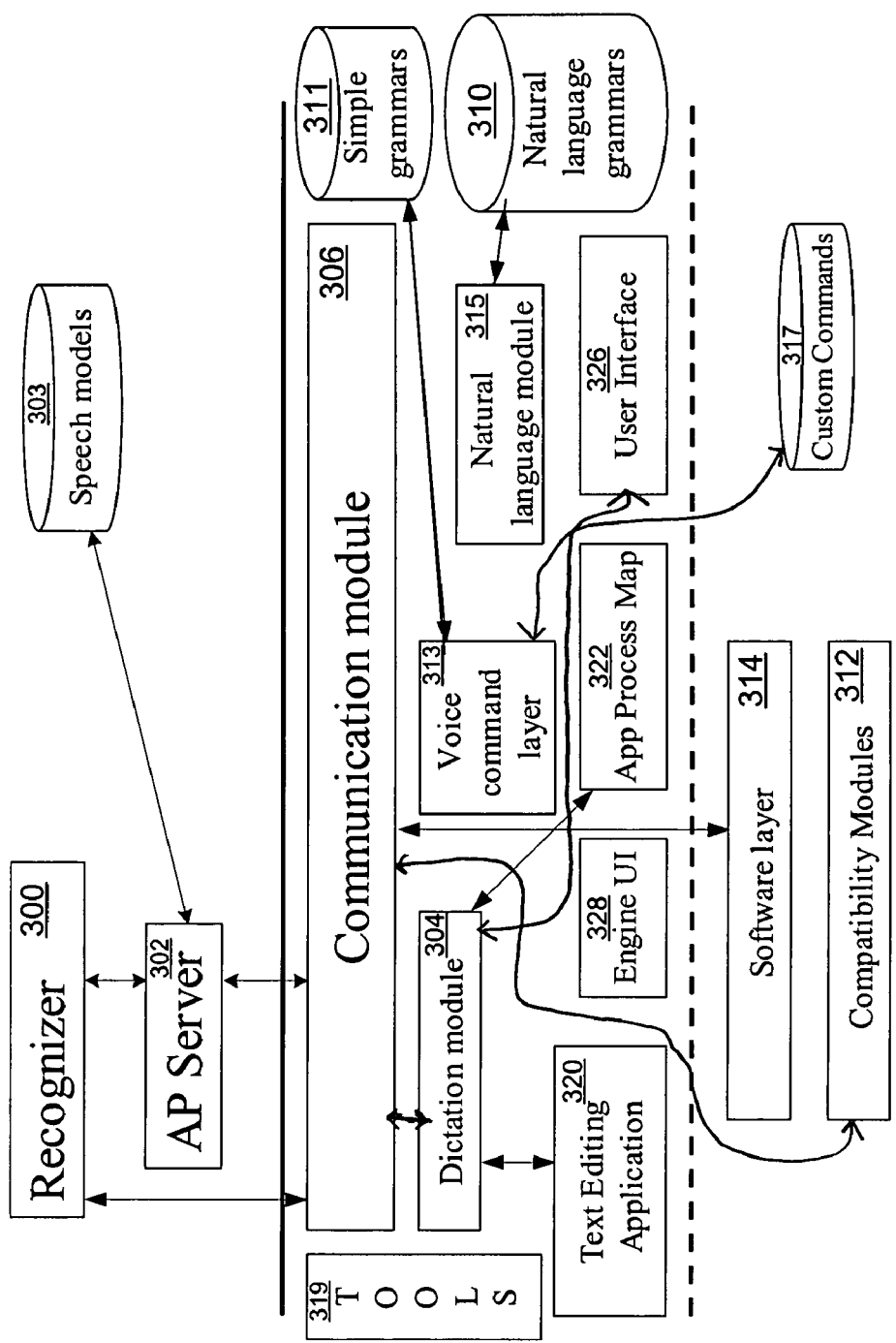

Referring to FIG. 3, in another implementation, the speech recognition software 124 includes a recognizer 300 that, like the recognizer 215, receives and processes frames of an utterance to identify text corresponding to the utterance. The software 124 includes an automatic punctuation server ("AP Server") 302 that processes output from the recognizer 300. The recognizer 300 outputs result objects that describe the results of the recognition of the utterance or part of the utterance.

A result object includes a set of information that the recognizer 300 acquires when a user speaks into the microphone 102. For example, if the user speaks "hello world," the result object contains a block of audio data that, when played back, would recite the user's speech "hello world," along with the times the speech started and ended. The result object also contains the word "hello," the time the word started and ended, and other information about the word "hello." Likewise, the result object contains the same information relating to the word "world." The result objects that are output by the recognizer 300 also include a list of recognition candidates, where each recognition candidate corresponds to a hypothesis and has an associated score. The result object also contains a list of alternative recognition candidates, such as "fellow world" and "hello wood," with similar sets of information about each alternative. In summary, a result object contains the information that the recognizer 300 knows or determines about what a user has just spoken. For one document, there are many result objects. The result objects may be stored within buffers (not shown) and may include acoustic data. The AP server 302 receives the acoustic data from the buffers associated with the recognizer 300.

The AP server 302 interacts with a speech models database 303, which contains one or more acoustic and/or language models that may be associated with particular users. The AP server 302 may process requests from a particular user to access and load an acoustic and/or language model associated with that user from the speech models database 303.

The AP server 302 and the recognizer 300 communicate with a dictation module 304 through a communication module 306. The communication module 306 is an application program interface that enables other programs to call the recognizer 300. Thus, the communication module 306 includes software that defines a standard way for other software to call the recognizer 300. Many of the calls through the communication module 306 are directed to the AP server 302 or to the dictation module 304. The communication module 306 may interact with a database 310 that includes natural-language grammars, a database 311 that includes simple grammars, compatibility modules 312, and be used by external developers who need to access the communication module 306 through a software layer 314.

A voice command layer module 313 may receive voice commands from a user and interact with the simple grammars database 311 to process those commands. The voice command layer module 313 also may interact with a custom command database 317 to enable users to add custom commands to, and retrieve custom commands from, the custom command database 317. A natural language module 315 may receive more complex voice commands from a user and interact with the natural-language grammars database 310 to process those more complex commands.

Tools module 319 includes additional components of the speech recognition software 124, such as, for example, executables and software to enable enrollment, vocabulary enhancement, and testing.

The dictation module 304 maintains a copy of the document that is being dictated, carries out requested actions like audio playback, capitalization, and correction, and stores the correlation between speech sounds and written characters. Output from the dictation module 304 is sent to applications such as a text editing application 320 (e.g., Dragon Pad) that is able to be used with dictation; an application process map 322 that provides a continually-updated list of which other applications are running; and a user interface 326 (e.g., Dragon Bar) that provides menu items for actions that can be performed by the system 100. Additionally, the AP server 302 interacts with the user interface engine 328, which is the basic interface software for the recognizer 300.

The AP server 302 uses a model that predicts, at every word gap, whether there is punctuation or no punctuation. In one implementation, the model includes a logistic regression model. If the AP server 302 determines that the word gap includes a punctuation event, the AP server 302 determines the kind of punctuation mark to which the event corresponds. A word gap is the time between the end of one word and the beginning of the next consecutive word. The model uses words before and after the gap (called text features) that may be accessed from the recognizer 300. The dictation module 304 also maintains information about the order among the text blocks. The model also may use acoustic features such as the length of silence following a current gap, a function of pitch (e.g., the average pitch of the word two back from a current gap), and a ratio of the average pitches of words one forward and one back from the current gap. Acoustic features may be accessed from the recognizer 300.

Figure 4:
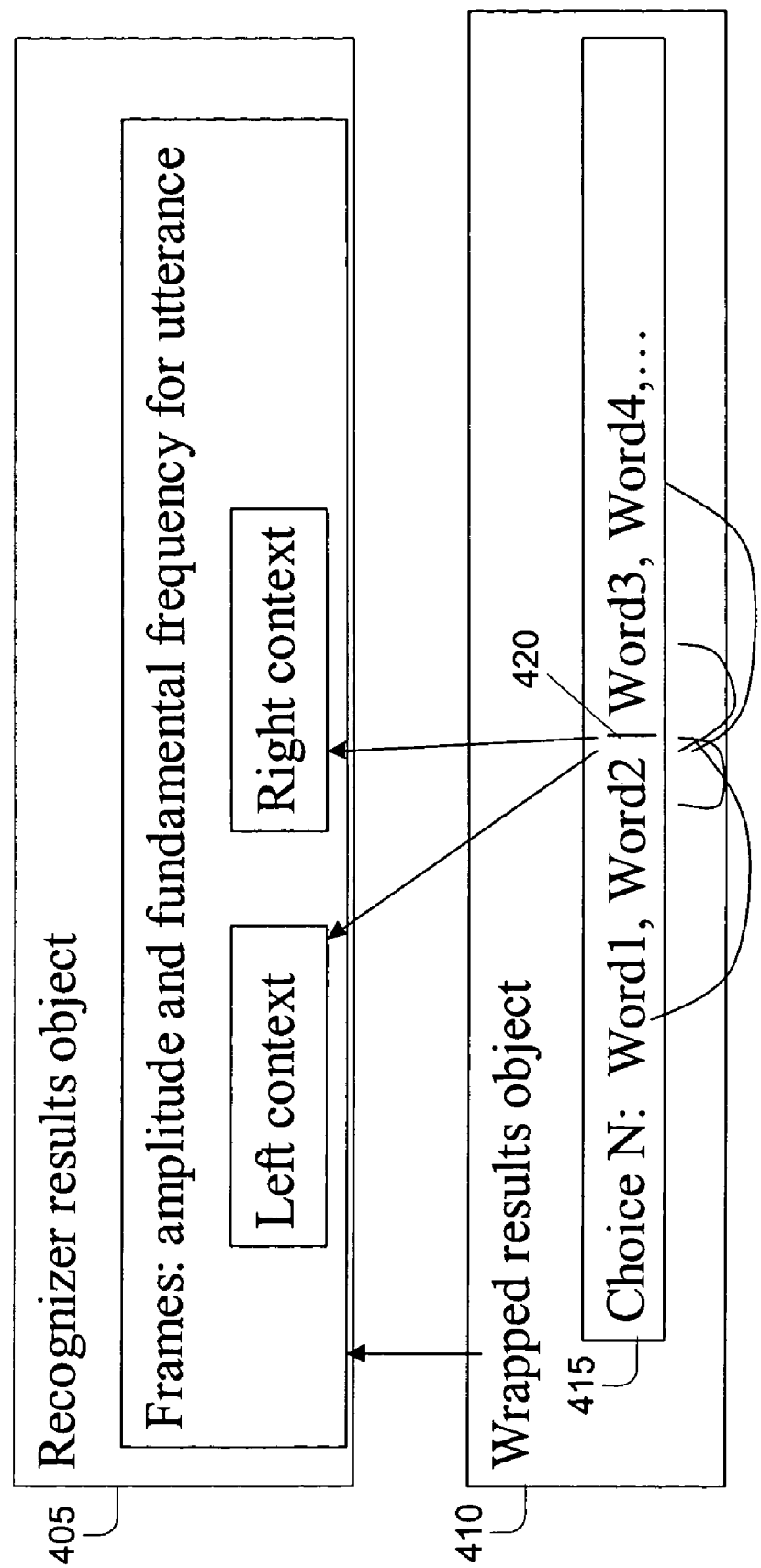
FIG. 4 is a representation of an algorithm for performing automatic insertion of non-verbalized punctuation using the system of FIG. 1.

Referring also to FIG. 4, the AP server 302 receives the results objects 405 from the recognizer 300 and forms wrapped results object 410 that includes choices 415. A wrapped results object 410 requires a calling program to use functions to access the data rather than letting the calling program access the data directly. Thus, there is a function to access the audio data, a function to access the time data, and a function to access the Nth alternative in the list.

After the AP server 302 completes processing, including autopunctuation, the output of the server is a sequence of recognized tokens that are passed to the dictation module 304 through the communication module 306. The dictation module 304 performs formatting functions on the outputted text by controlling or altering capitalization and spacing relative to inserted punctuation marks. Thus, if a period is inserted by the AP server 302, whether from autopunctuation or from verbalized punctuation, the dictation module 304 inserts an extra space after the period and then capitalizes the next word following the period. The AP server 302 uses both language model and acoustic content to the left and to the right of the gap 420 or the potential insertion point.

Figure 5:
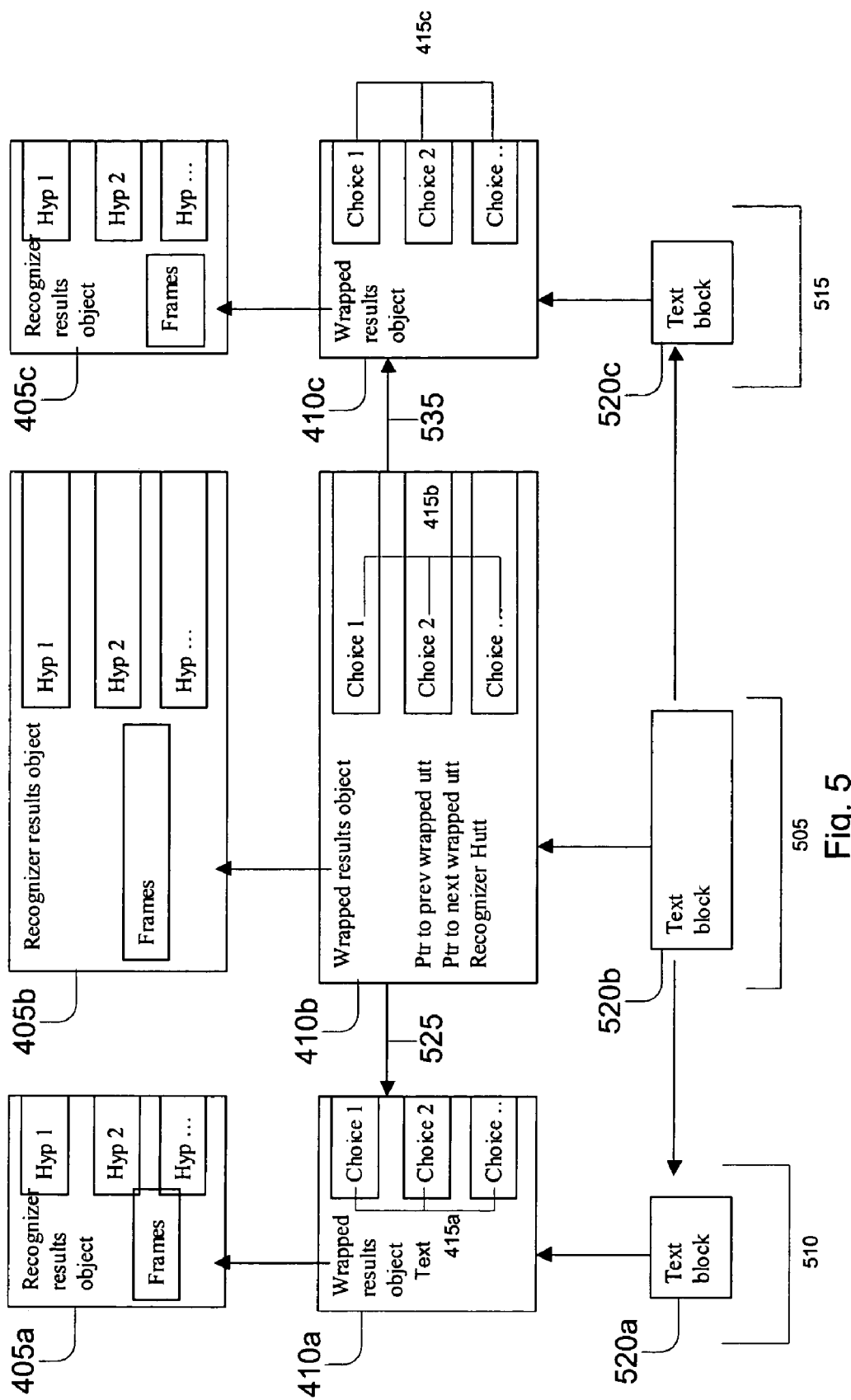
FIG. 5 is a representation of data used in the algorithm of FIG. 4.

Referring also to FIG. 5, a block diagram illustrates three utterances 505, 510, and 515. Each utterance includes a text block 520*a*, 520*b*, and 520*c*, a wrapped results object 410*a*, 410*b*, and 410*c* having one or more choices 415*a*, 415*b*, and 415*c*, and recognizer result objects 405*a*, 405*b*, and 450*c*. When information for a particular insertion point is not all within a current utterance 505, the information from a previous utterance 510 and next utterance 515 also may be needed as defined by the dictation module 304 and then transmitted to the AP server 302. For example, the wrapped results object 410*b* may include a pointer 525 to a previous wrapped results object 410*a* that is part of the previous utterance 510. Wrapped results object 410*b* also may include a pointer 535 to the next wrapped results object 410*c* that is part of the next utterance 515. In this manner, both language model and acoustic content from utterances surrounding a current utterance 505 may be used.

Often, at the end of an utterance, there is considerable information in the words after a potential insertion point. In this case, the AP server 302 performs the modeling on the last word of the utterance once the next utterance is received and recognized by the recognizer 300. Thus, for example, if a user speaks a first utterance:

"Here is some unpunctuated text"

then pauses, and then speaks a second utterance:

"on another topic"

the engine UI 328 outputs:

"Here is some unpunctuated text".

After the second utterance, punctuation is inserted at the end of the first utterance (and capitalization is adjusted) and the engine UI 328 now outputs:

"Here is some unpunctuated text. On another topic"

There are times during dictation when a user inserts text by typing. In this case, the text buffer for the dictation module 304 has no corresponding result objects from the recognizer 300 and thus no acoustic data is available.

A user may be able to turn off the automatic punctuation features of the AP server 302.

If a user selects a single word within a middle text block, a correction dialogue window opens and the AP server 302 adds adjacent punctuation to the selected text if needed. If the user selects a word at the edges of a text block, then the AP server 302 may not insert punctuation to the selected text. Using the example above, if the AP server 302 did not perform the punctuation model, the output would be:

"Here is some unpunctuated text | on another topic", where | indicates an utterance boundary or a text block boundary, which acts as a potential insertion point. Once the AP server 302 runs the model for punctuation, the output is:

"Here is some unpunctuated text |. On another topic".

After the user selects the word "On," the output to the UI is:

"Here is some unpunctuated text |.On another topic".

On the other hand, after selection of the word "text," the output to the UI is:

"Here is some unpunctuated text |. On another topic".

Note that the period is not selected if the word "text" is selected.

Figure 6:
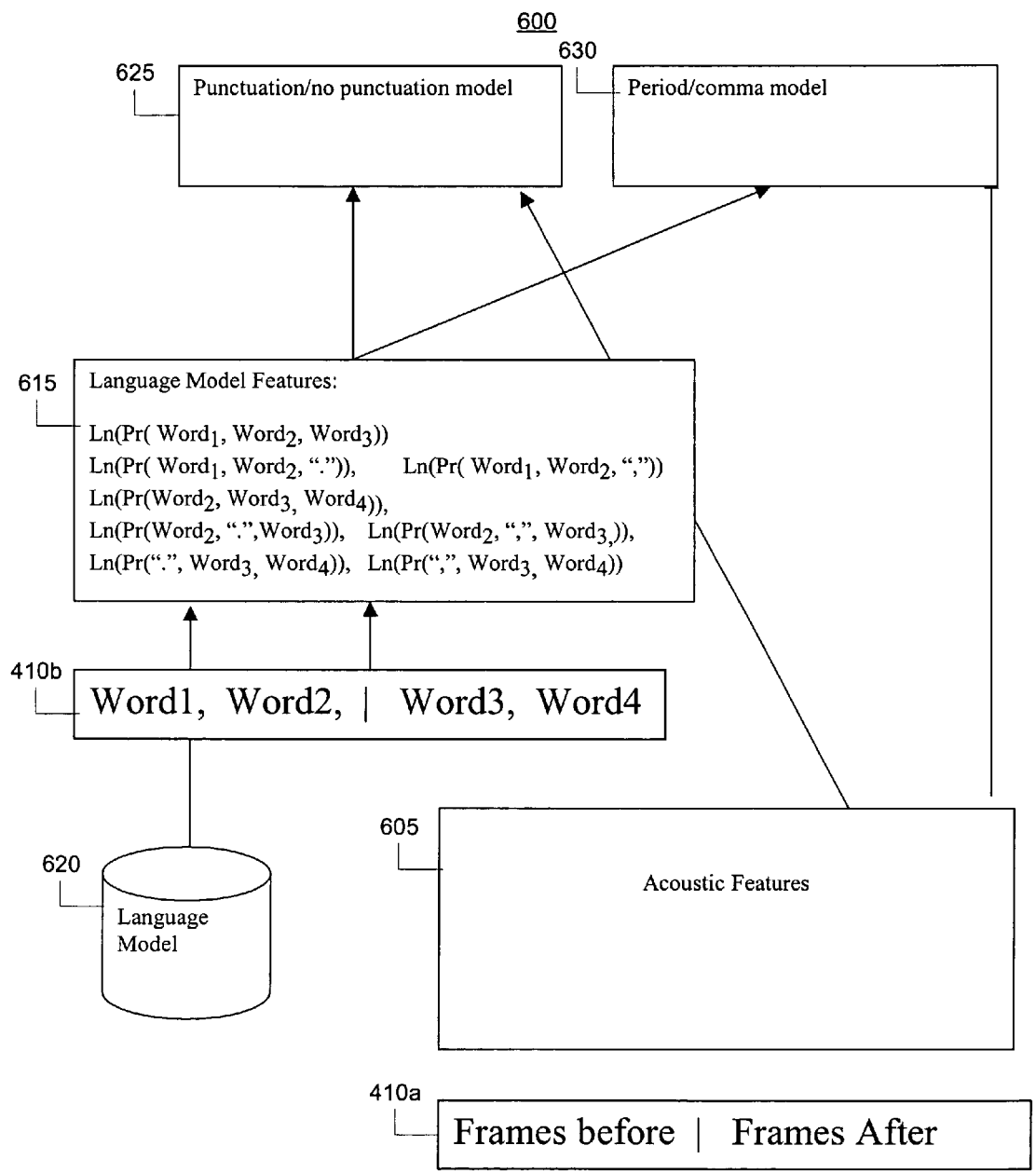
FIGS. 6 and 7 are flow charts of exemplary processes for determining whether or not to insert non-verbalized punctuation and, if so, which non-verbalized punctuation to insert.

Referring to FIG. 6, an exemplary process 600 is illustrated to determine whether or not to insert non-verbalized punctuation, and if so, what type of non-verbalized punctuation. Acoustic features 605 such as for example, word gap or average fundamental frequency, are extracted from the wrapped results object 410*a*. Similarly, language model features 615 are extracted from the language model 620 using the words extracted from the wrapped results object 410*b*. The language model features 615 may include the probability of a particular trigram. Both the acoustic features 605 and the language model features 615 are provided as input to a punctuation/no punctuation model classifier 625 and a period/comma model classifier 630.

Figure 7:
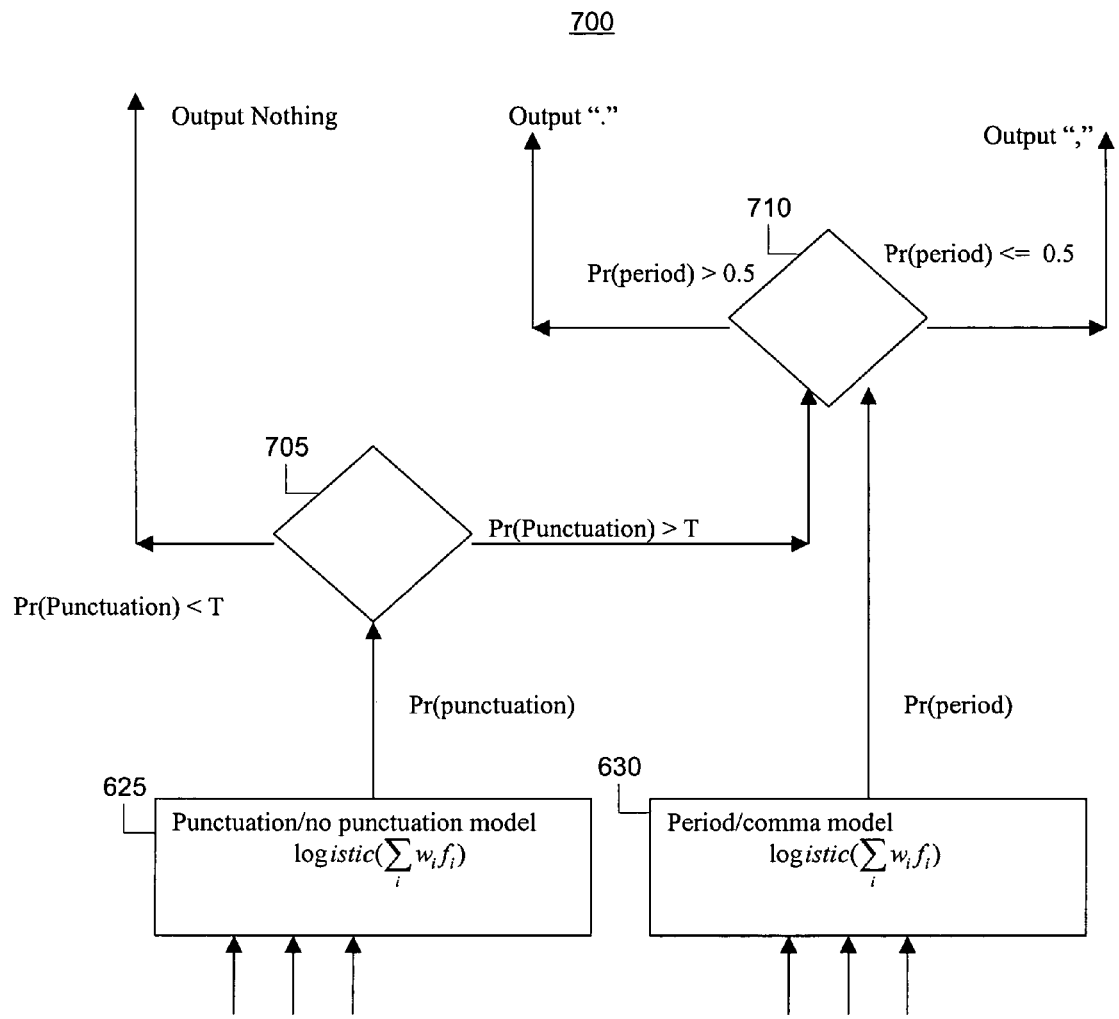

Referring to FIG. 7, the punctuation/no punctuation model classifier 625 is used to estimate the probability that there is punctuation at a particular space between words. The period/comma model classifier estimates the probability that, if there is punctuation, the punctuation is a period. One exemplary type of classifier includes a logistic regression model, in which the inputted features are combined in a linearly weighted model. The output is passed through a nonlinearity function to force the outcome to a probability (i.e., between 0 and 1). One logistic function that may be used includes:

$$\text{logistic}(x) = \frac{1}{1+e^{-x}}$$

For example, the punctuation/no punctuation model classifier 625 estimates the probability that there is non-verbalized punctuation at a particular space between words (Pr(punctuation)). A weighted sum of feature values is fed through a nonlinear function to produce a probability estimate, Pr(punctuation). If it is determined (705) that the Pr(punctuation) is less than a threshold level, T, then no punctuation is output. If it is determined (705) that the Pr(punctuation) is greater than the threshold level, T, then non-verbalized punctuation is inserted at the word gap based on the outcome of the period/comma model classifier 630. The threshold level, T, may be configurable. In one implementation, if Pr(punctuation)=T, then non-verbalized punctuation is inserted. In another implementation, if Pr(punctuation)=T, then the non-verbalized punctuation is not inserted.

The period/comma model classifier 630 provides a probability that the non-verbalized punctuation is a period, Pr(period). In other implementations, other punctuation type classifiers similar to classifier 630 may be used. If it is determined (710) that the Pr(period) is greater than 0.5, then a non-verbalized period is output. If it is determined (710) that the Pr(period) is less than 0.5, then a comma is output. In one implementation, if the Pr(period)=0.5, then a period is output. In another implementation, if the Pr(period)=0.5, then a comma is output. Probability thresholds other than 0.5 may be used.

Figure 8:
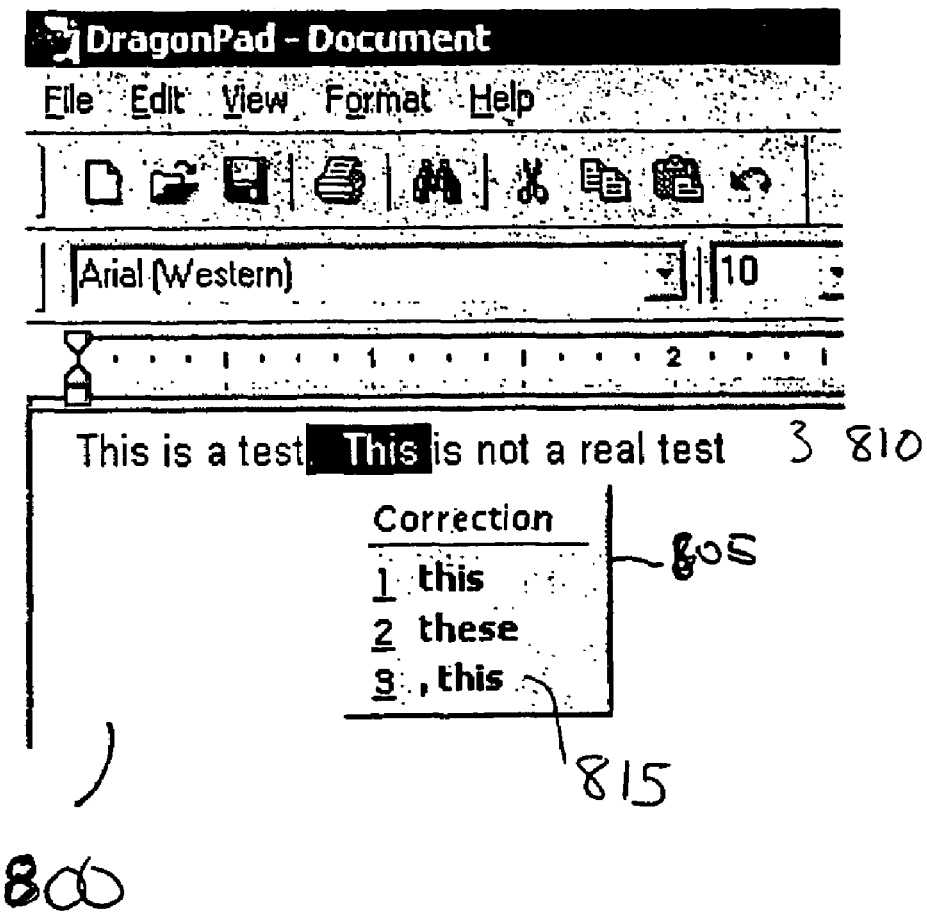
FIGS. 8 and 9 are screen shots of a correction dialogue used in the system of FIG. 1.

Referring to FIG. 8, a graphical user interface that includes a correction dialogue 800 may be presented to a user. The correction dialogue 800 may include a choice list 805, which includes the recognition alternatives for the selection, augmented with punctuation choices. The correction dialogue 800 includes a window to display a selected recognition result including the non-verbalized punctuation associated with the utterance. The choice list 805 includes a list of recognition alternatives with at least one of the recognition alternatives including a changed to the non-verbalized punctuation and associated adjustments in spacing and other punctuation. For example, as shown in FIG. 8, the correction dialogue 800 includes an utterance 810 that states "This is a test. This is not a real test". A portion of the utterance 810 is highlighted to include the period and the word "This" following the period. The correction dialogue 800 includes a list of choices 805 to replace the highlighted text from the utterance 810. The choice list 805 includes at least one correction 815 that changes the non-verbalized punctuation to include a punctuation choice and the correct spacing.

Figure 9:
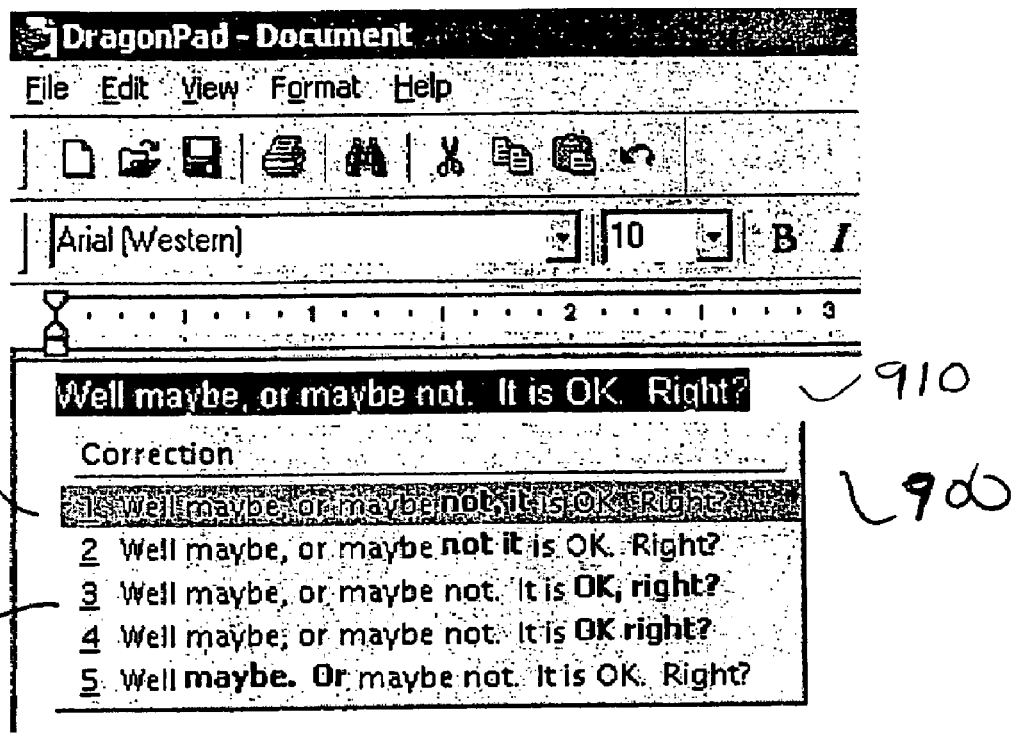

Similarly, FIG. 9 illustrates a graphical user interface that includes a correction dialogue 900 which presents the user with a choice list 905. The correction dialogue 900 includes a current utterance 910. In this instance, the current utterance 910 is highlighted and a list of recognition alternatives is displayed with at least one of the recognition alternatives including a change to the non-verbalized punctuation and associated adjustments and spacing and other punctuation. For example, the first recognition alternative 915 in choice list 905 is highlighted and offers the user a different recognition alternative that includes changing the period after the word "not" from a period to a comma to include changing the spacing appropriately.

In one implementation, the rules for punctuation choices may include offering to change the inserted punctuation wherever autopunctuation was inserted, by changing a period to a comma, changing a comma to a period, deleting a period, or deleting a comma, and, at the start of an utterance, offering to insert a period, but not a comma, at the end of the previous utterance.

Figure 10:
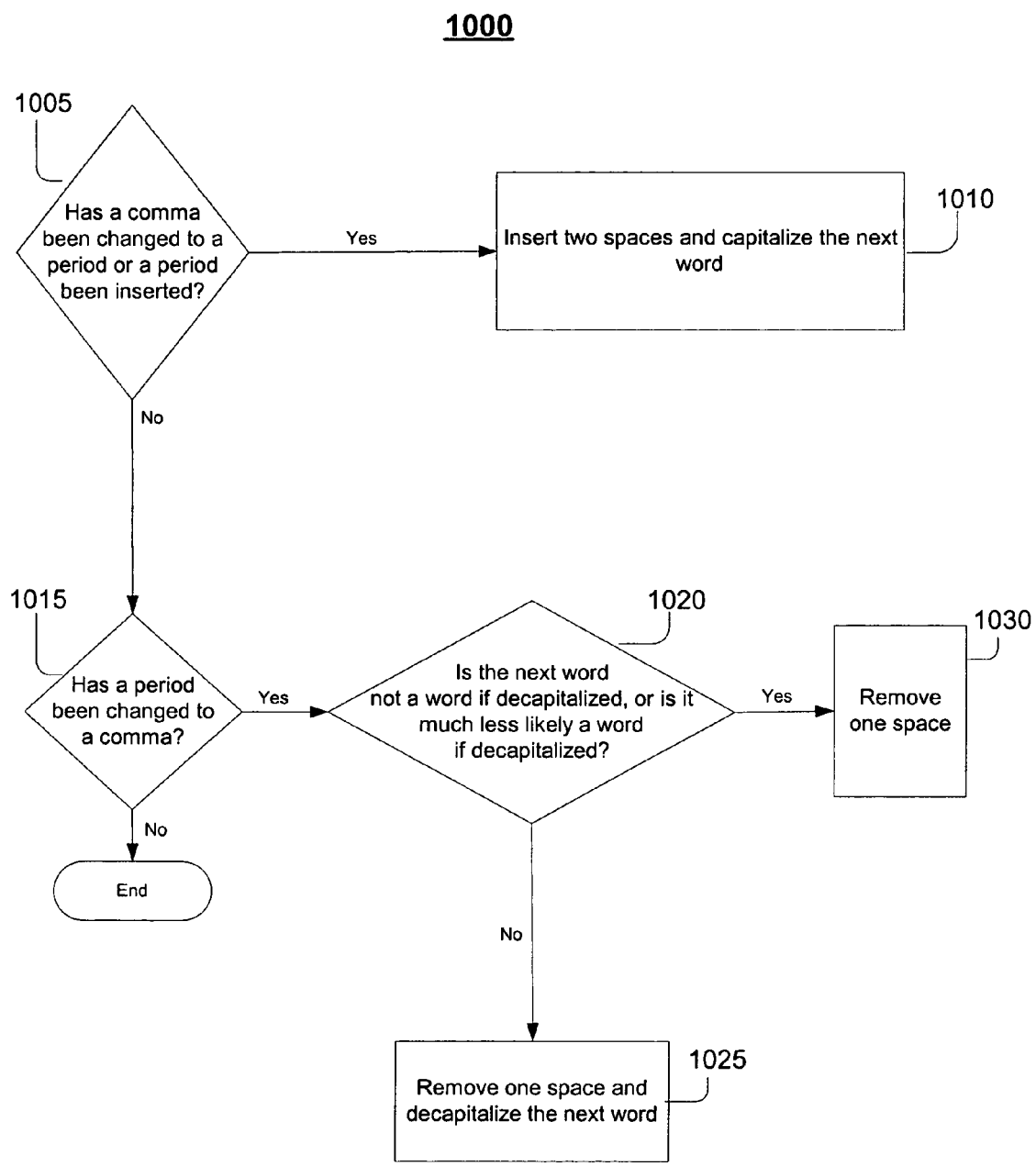
FIG. 10 is a flow chart of an exemplary process for adjusting punctuation and spacing.

Referring to FIG. 10, a process 1000 illustrates that punctuation and spacing may be adjusted by the dictation module 304 for each proposed change in punctuation. If a comma is changed to a period, or if a period is inserted (step 1005), two spaces are inserted, and the next word is capitalized (step 1010). If a period is changed to a comma (step 1015), then the system determines whether the tokenizer indicates that the next word is not a word in its uncapitalized form, or much less likely than the capitalized form (step 1020). If it is appropriate to decapitalize the next word, then the system decapitalizes the next word and removes a space (step 1025). If it is not appropriate to decapitalize the next word (step 1020), then a space is removed (step 1030). For example, if a user removes a period before the name "England," the module 304 does not decapitalize, because the dictionary does not include a word "england." If a user removes a period before the word "I," or before the name "John" the module 304 does not decapitalize, even though "i" and "john" are words in the dictionary, because they are much less frequent than their capitalized forms.

If the user selects some text and retypes, no autopunctuation is done on the retyped text.

If the user corrects some text directly in the text buffer or by respeaking the text, without bringing up the correction dialog, the AP server 302, in certain circumstances, adjusts text in the corresponding text buffer.

The application editor, through control of the AP server 302 and the dictation module 304, is able to adjust spacing and capitalization upon insertion or deletion of punctuation and/or text through key strokes; upon deletion by a natural language grammar command (for example, "delete next word" or "delete next line"); upon deletion using a dictation command (for example, "delete that"); and upon insertion by speaking "period."

Thus, a user is able to correct text and formatting with the use of a single action. For example, if the user removes a period (using a key stroke or using a dictation command), then the AP server 302 and dictation module 304 additionally remove a space and remove capitalization as needed. The actions of removing the space and removing the capitalization occur when the user performs only the single action of deleting a period. When the user acts to edit punctuation, the AP server 302 invokes the dictation module 304 to re-format the area surrounding the edited punctuation.

Figure 11:
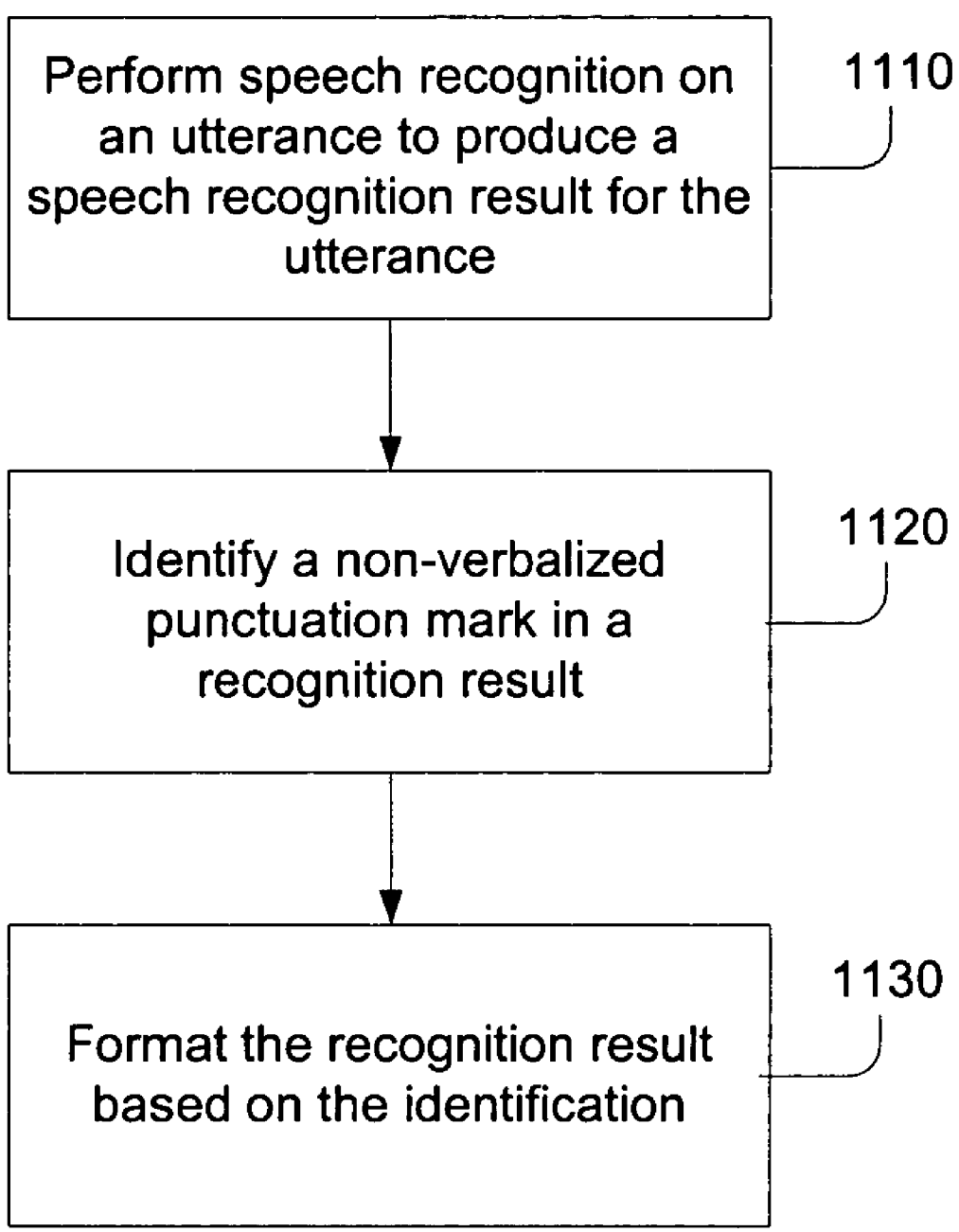
FIG. 11 is a flow chart of an exemplary process for recognizing punctuation in computer-implemented speech recognition.

Referring to FIG. 11, a process 1100 for recognizing punctuation in computer-implemented speech recognition includes performing speech recognition on an utterance to produce a speech recognition result for the utterance (step 1110). A non-verbalized punctuation mark is identified in a recognition result (step 1120) and the recognition result is formatted based on the identification (step 1130).

Figure 12:
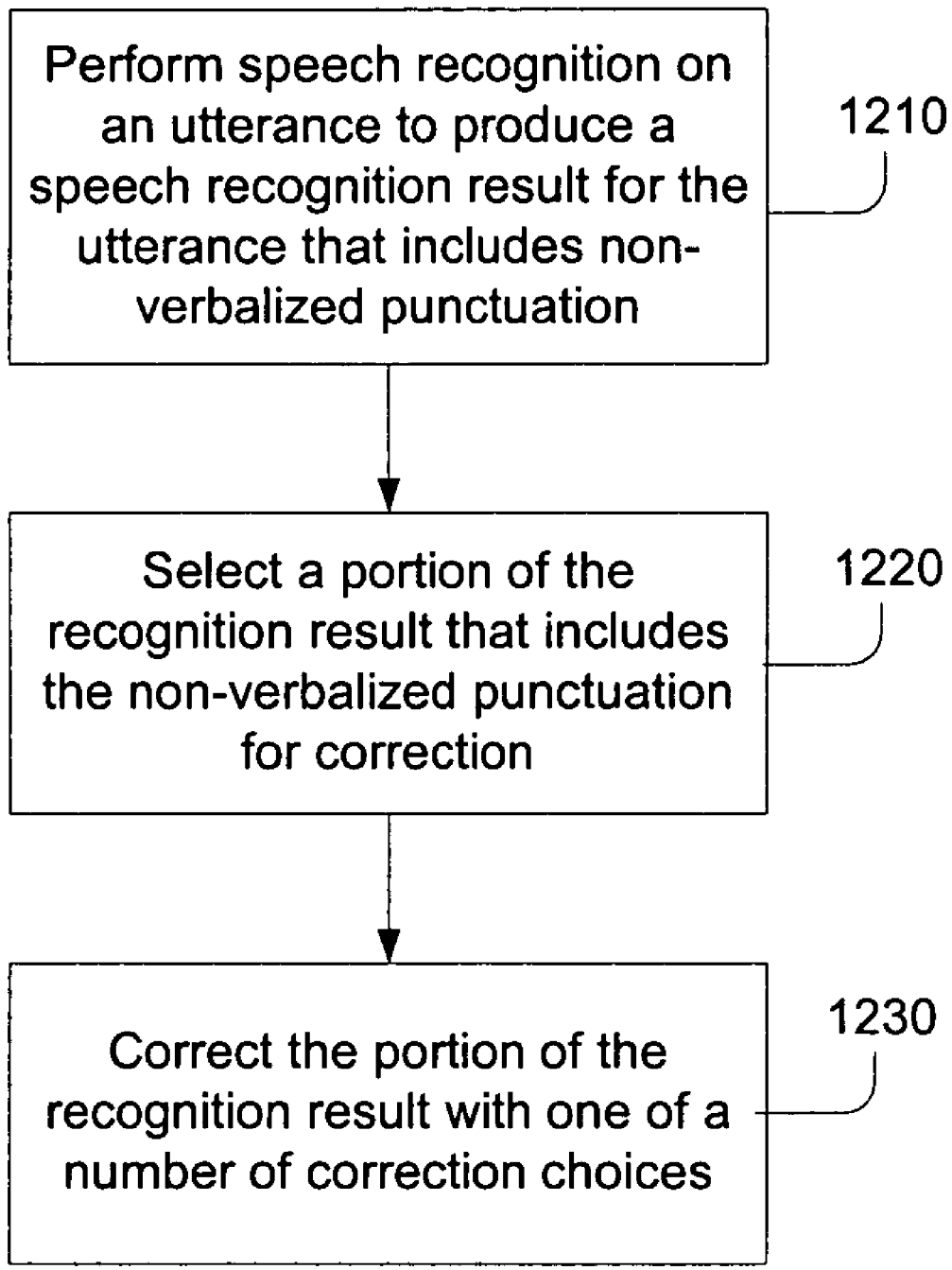
FIG. 12 is a flow chart of an exemplary process for correcting incorrect text associated with recognition errors in computer-implemented speech recognition.

Referring to FIG. 12, a process 1200 for correcting incorrect text associated with recognition errors in computer-implemented speech recognition includes performing speech recognition on an utterance to produce a speech recognition result for the utterance (step 1210). A portion of the recognition result that includes the non-verbalized punctuation may be selected for correction (step 1220). The portion of the recognition result that includes the non-verbalized punctuation may be corrected with one of a number of correction choices (step 1230).

The described systems, methods, and techniques may be implemented in digital electronic circuitry and/or analog circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; Digital Video Disc Read-Only Memory (DVD-ROM); and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims. For example, other types non-verbalized punctuation may be automatically inserted and formatted in speech recognition including, but not limited to, questions marks, exclamations points, quotations, apostrophes, colons, semicolons, and hyphens. Also, the different types of non-verbalized punctuation may be automatically inserted and formatted according to the punctuation and grammar rules of languages other than English.

What is claimed is:

1. A method of recognizing punctuation in computer-implemented speech recognition in a computer having a processor responsive to instruction for performing the method of recognizing punctuation, the method comprising:
   receiving the instructions by the processor, and executing the instructions for:
   performing speech recognition on an utterance to produce a recognition result for the utterance;
   identifying a non-verbalized punctuation mark in a recognition result including predicting the non-verbalized punctuation mark using at least one text feature and at least one acoustic feature related to the utterance;
   inserting the non-verbalized punctuation mark into the recognition result; and
   formatting the recognition result based on the identification of the non-verbalized punctuation mark after the non-verbalized punctuation mark has been inserted in the recognition result;
   wherein the acoustic feature includes one or more of a length of a period of silence and a function of pitch of words near the period of silence, the acoustic feature including an average pitch of words near the period of silence and a function of a pitch of words adjacent to the word gap, the acoustic features based on word adjacent to the word gap including the average pitch of the words two back from the word gap and the a ratio of the average pitch of words one forward and one back from the word gap.

2. The method as in claim 1 wherein the acoustic feature includes a ratio of an average pitch of words near the period of silence.

3. The method as in claim 1 wherein formatting the recognition result includes controlling or altering spacing relative to the non-verbalized punctuation mark.

4. The method as in claim 1 wherein formatting the recognition result includes controlling or altering capitalization of words relative to the non-verbalized punctuation mark.

5. The method as in claim 1 wherein: the non-verbalized punctuation mark includes a period, and formatting the recognition result includes inserting an extra space after the period and capitalizing a next word following the period.

6. The method of claim 1 wherein using the text features include identifying words before and after a word gap defined by the period of silence.

7. The method of claim 6 wherein the acoustic features include a trigram adjacent to the word gap.

8. A method of recognizing punctuation in computer-implemented speech recognition in a computer having a processor responsive to instructions for performing the method of recognizing punctuation, the method comprising:
   receiving the instructions by the processor, and executing the instructions for:
   performing speech recognition on an utterance to produce a recognition result for the utterance;
   identifying a non-verbalized punctuation mark in a recognition result including predicting the non-verbalized punctuation mark using at least one acoustic feature related to the utterance;
   formatting the recognition result based on the identification;
   selecting a portion of the recognition result to be corrected that includes the non-verbalized punctuation mark; and
   correcting the portion of the recognition result that includes the non-verbalized punctuation mark with one of a number of correction choices, at least one of the correction choices including a change to the non-verbalized punctuation mark, the acoustic feature including an average pitch of words near the period of silence and a function of a pitch of words adjacent to the word gap, the acoustic feature based on words adjacent to the word gap including the average pitch of the words two back from the word gap and the a ratio of the average pitch of words one forward and one back from the word gap.

9. The method as in claim 8 wherein at least one of the correction choices does not include the non-verbalized punctuation mark.

10. An apparatus comprising a computer-readable storage medium having instructions stored thereon that when executed by a machine result in at least the following:

performing speech recognition on an utterance to produce a recognition result for the utterance;

identifying a non-verbalized punctuation mark in a recognition result including predicting the non-verbalized punctuation mark using at least one text feature and at least one acoustic feature related to the utterance;

inserting the non-verbalized punctuation mark into the recognition result; and formatting the recognition result based on the identification of the non-verbalized punctuation mark after the non-verbalized punctuation mark has been inserted into the recognition result;

wherein the acoustic feature includes one or more of a length of a period of silence and a function of pitch of words near the period of silence, the acoustic feature including an average pitch of words near the period of silence and a function of a pitch of words adjacent to the word gap, the acoustic features based on words adjacent to the word gap including the average pitch of the words two back from the word gap and the a ratio of the average pitch of words one forward and one back from the word gap.

11. A method of recognizing punctuation in computer-implemented speech recognition dictation in a computer having a processor responsive to instructions for performing the method of recognizing punctuation, the method comprising:

receiving the instructions by the processor, and executing the instructions for:

performing speech recognition on an utterance to produce a recognition result for the utterance;

identifying a non-verbalized punctuation mark in a recognition result;

determining where to insert the non-verbalized punctuation mark within the recognition result based on the identification using at least one text feature and at least one acoustic feature related to the utterance to predict where to insert the non-verbalized punctuation mark; and inserting the non-verbalized punctuation mark into the recognition result;

wherein the acoustic feature includes one or more of a length of a period of silence and a function of pitch of words near the period of silence, the acoustic feature including an average pitch of words near the period of silence and a function of a pitch of words adjacent to the word gap, the acoustic feature based on words adjacent to the word gap including the average pitch of the words two back from the word gap and the a ratio of the average pitch of words one forward and one back from the word gap.

12. The method as in claim 11 wherein the acoustic feature includes an average pitch of words near the period of silence.

13. The method as in claim 11 wherein the acoustic feature includes a ratio of an average pitch of words near the period of silence.

14. An apparatus comprising a computer-readable storage medium having instructions stored thereon and having a processor responsive to the instructions that when executed by a machine result in at least the following:

receiving the instructions by the processor, and executing the instructions for:

performing speech recognition on an utterance to produce a recognition result for the utterance;

identifying a non-verbalized punctuation mark in a recognition result;

determining where to insert the non-verbalized punctuation mark within the recognition result based on the identification using at least one text feature and at least one acoustic feature related to the utterance to predict where to insert the non-verbalized punctuation mark; and inserting the non-verbalized punctuation mark into the recognition result;

wherein the acoustic feature includes one or more of a length of a period of silence and a function of pitch of words near the period of silence, the acoustic feature including an average pitch of words near the period of silence and a function of a pitch of words adjacent to the word gap, the acoustic features based on words adjacent to the word gap including the average pitch of the words two back from the word gap and the a ratio of the average pitch of words one forward and one back from the word gap.

\* \* \* \* \*